(12) United States Patent
Robinson

(10) Patent No.: US 7,189,429 B2
(45) Date of Patent: *Mar. 13, 2007

(54) METHOD FOR RENOVATING PIPELINES

(75) Inventor: Ian Robinson, North Yorkshire (GB)

(73) Assignee: E. Wood Limited, North York (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/864,650

(22) Filed: Jun. 8, 2004

(65) Prior Publication Data

US 2004/0247785 A1    Dec. 9, 2004

(30) Foreign Application Priority Data

Jun. 9, 2003    (GB)    ................. 0313275.0

(51) Int. Cl.
*B05D 7/22*    (2006.01)

(52) U.S. Cl. ...................... 427/230; 427/236

(58) Field of Classification Search ............ 427/140, 427/142, 230–239; 118/317, DIG. 10, DIG. 13
See application file for complete search history.

(56) References Cited

U.S. PATENT DOCUMENTS

| | | | |
|---|---|---|---|
| 4,027,059 A | | 5/1977 | Koons |
| 4,663,201 A | * | 5/1987 | House et al. ............ 427/388.2 |
| 4,705,814 A | | 11/1987 | Grigsby, Jr. et al. |
| 4,748,192 A | | 5/1988 | Smith |
| 5,489,704 A | | 2/1996 | Squiller et al. |
| 5,587,117 A | | 12/1996 | Eisen et al. |
| 5,616,677 A | | 4/1997 | Primeaux, II et al. |
| 5,993,924 A | | 11/1999 | Deroch et al. |
| 6,013,755 A | | 1/2000 | Primeaux, II et al. |
| 6,074,702 A | * | 6/2000 | Robinson .................... 427/386 |
| 6,730,353 B2 | * | 5/2004 | Robinson .................... 427/236 |
| 2002/0045006 A1 | * | 4/2002 | Robinson .................... 427/233 |

FOREIGN PATENT DOCUMENTS

| | | |
|---|---|---|
| DE | 19730666 | 1/1999 |
| EP | 0568388 A1 | 3/1993 |
| EP | 0781606 A2 | 11/1996 |
| EP | 0936235 | 8/1999 |
| EP | 1179574 | 2/2002 |
| WO | WO00/45962 | 8/2000 |
| WO | WO03/014613 | 2/2003 |

OTHER PUBLICATIONS

Paint and Surface Coatings: Theory and Practice, 2nd Edition, Copyright 1999 by Woodhead Publishing, pp. 71-73.*
"Performance and Processing Enhancements of Aromatic Polyurea Elastomer Systems Prepared from High 2,4'-MDI Isocyanates" Perez, Jr. et al., Modern Paint & Coatings Journal, Jun. 1991 (available from www.huntsman.com/pu/Media/apipaper.pdf).
"Polyurethanes for Coatings" Bock, Manfred; pp. 23-25; Published by Vincent Verlag, Hannover, Germany (2001).

* cited by examiner

*Primary Examiner*—William Phillip Fletcher, III
(74) *Attorney, Agent, or Firm*—Jacqueline M. Nicol; Squire, Sanders & Dempsey L.L.P.

(57) ABSTRACT

A two part coating system comprises a first part comprising one or more aliphatic polyisocyanates, and a second part comprising one or more aromatic polyamines. In one group of embodiments, the second part comprises one or more aromatic polyamines, blended with one or more polyhydric alcohol compounds. In another group of embodiments, the polyhydric alcohol compounds are dispensed with and the required properties are achieved by selection of the type of polyisocyanate compound used and by close control of the proportions thereof. The coating system is suitable for application by spraying using equipment in which the two parts are first combined at the point of spraying, and may be applied to the internal surfaces of below-ground pipeline infrastructures, for example by means of a centrifugal spinning head assembly. In particular, the system may be used for the renovation of existing drinking water pipelines.

9 Claims, 5 Drawing Sheets

FIG. 1

| SYSTEM | COMPOSITION (pbw) | | | | |
|---|---|---|---|---|---|
| | ETHACURE 100 | JEFFAMINE D2000 | VERSALINK P-650 | Amine SDA 172 | DESMODUR N3400 |
| A | 30 | 70 | - | | 75 |
| B | 40 | 60 | - | - | 95 |
| C | 20 | - | 80 | - | 80 |
| D | 30 | - | 70 | - | 95 |
| E | 30 | 35 | 35 | - | 85 |
| F | 40 | 30 | 30 | - | 105 |
| G | 30 | 60 | - | 10 | 95 |
| H | 40 | 50 | - | 10 | 115 |

FIG. 2

| SYSTEM | FILM SET TIME At 3mm (Mins) | TENSILE STRENGTH (Mpa) | ELONGATION AT BREAK (%) | FLEXURAL STRENGTH (Mpa) |
|---|---|---|---|---|
| A | 1.5 | 26.0 | 50 | 37.0 |
| B | 1.5 | 28.0 | 40 | 42.0 |
| C | 2.5 | 26.0 | 20 | 34.0 |
| D | 2.5 | 30.0 | 15 | 40.0 |
| E | 2 | 28.0 | 40 | 40.0 |
| F | 2 | 31.0 | 30 | 42.0 |
| G | 3 | 27.0 | 50 | 37.0 |
| H | 3 | 28.0 | 40 | 41.0 |

FIG. 3

| SYSTEM | BS 6920 FLAVOUR & ODOUR | T.O.C (mg/Litre) |
|---|---|---|
| A | PASS | 5.4 |
| B | PASS | 5.1 |
| C | PASS | 6.3 |
| D | PASS | 6.0 |
| E | PASS | 5.9 |
| F | PASS | 5.9 |
| G | PASS | 6.0 |
| H | PASS | 6.2 |

FIG. 4

| SYSTEM | COMPOSITION (pbw) | | | | | |
|---|---|---|---|---|---|---|
| | ETHACURE 100 | DESMOPHEN 1145 | DESMOPHEN 1150 | SOVERMOL 805 | SOVERMOL 815 | DESMODUR N3400 |
| J | 20 | 80 | - | - | - | 105 |
| K | 30 | 70 | - | - | - | 120 |
| L | 20 | - | 80 | - | - | 90 |
| M | 30 | - | 70 | - | - | 105 |
| N | 20 | - | - | 80 | - | 90 |
| P | 30 | - | - | 70 | - | 105 |
| Q | 20 | - | - | - | 80 | 95 |
| R | 30 | - | - | - | 70 | 110 |

FIG. 5

| SYSTEM | FILM SET TIME at 3mm (MINS) | TENSILE STRENGTH (Mpa) | ELONGATION AT BREAK (%) | FLEXURAL STRENGTH (Mpa) |
|---|---|---|---|---|
| J | 3.5 | 18.0 | 30 | 31.0 |
| K | 3 | 20.0 | 20 | 33.0 |
| L | 3.5 | 19.0 | 40 | 29.0 |
| M | 3 | 20.0 | 30 | 31.0 |
| N | 3.5 | 24.0 | 50 | 35.0 |
| P | 3 | 26.0 | 40 | 38.0 |
| Q | 3.5 | 25.0 | 40 | 32.0 |
| R | 3 | 26.0 | 30 | 34.0 |

FIG. 6

| SYSTEM | BS 6920 FLAVOUR & ODOUR | T.O.C (mg/Litre) |
|---|---|---|
| J | FAIL | 2.5 |
| K | FAIL | 2.2 |
| L | PASS | 1.5 |
| M | PASS | 1.2 |
| N | PASS | 0.7 |
| P | PASS | 0.6 |
| Q | FAIL | 1.9 |
| R | FAIL | 1.6 |

FIG. 7

| SYSTEM | COMPOSITION (pbw) | | |
|---|---|---|---|
| | DESMODUR N3800 | DESMODUR N3400 | ETHACURE 100 |
| S | 100 | 0 | 25 |
| T | 90 | 10 | 27 |
| V | 80 | 20 | 30 |
| W | 70 | 30 | 32.5 |

FIG. 8

| SYSTEM | FILM SET TIME @ 3mm (Mins) | TENSILE STRENGTH (MPa) | ELONGATION AT BREAK (%) | FLEXURAL STRENGTH (Mpa) |
|---|---|---|---|---|
| S | 2.5 | 23.0 | 60 | 35.0 |
| T | 2.5 | 25.0 | 40 | 40.0 |
| V | 2 | 28.0 | 30 | 45.0 |
| W | 2 | 32.0 | 20 | 48.0 |

FIG. 9

| SYSTEM | BS 6920 FLAVOUR & ODOUR | T.O.C (mg/L) | GCMS GENERAL SURVEY |
|---|---|---|---|
| S | PASS | 0.5 | Acceptable. No unknown compounds present > 2μg/L |
| T | PASS | 0.5 | Acceptable. No unknown compounds present > 2μg/L |
| V | PASS | 0.4 | Acceptable. No unknown compounds present > 2μg/L |
| W | PASS | 0.4 | Acceptable. No unknown compounds present > 2μg/L |

US 7,189,429 B2

METHOD FOR RENOVATING PIPELINES

RELATED APPLICATION

This application claims priority to United Kingdom Application Serial No. 0313275.0, filed Jun. 9, 2003 by inventor Ian Robinson.

FIELD OF THE INVENTION

THE PRESENT INVENTION relates to a method for the renovation of existing pipeline infrastructures. More particularly, the present invention relates to a method for the renovation of existing drinking water pipelines by means of the application of a liquid, two part coating composition to the internal surface of the pipeline.

BACKGROUND OF THE INVENTION

Existing trenchless methods for the structural renovation of drinking water pipelines rely on the insertion of a moulded material, such as a polyethylene pipe or liner, inside an existing pipe. The three main trenchless technologies employed for this purpose can be summarised according to the following:

Pipe in Pipe Method

A moulded (e.g. polyethylene) pipe with a diameter smaller than that of the existing pipe is either pulled or pushed into the existing pipe. By virtue of being an extremely simple method, it has been used to renovate not only drinking water pipelines, but many other pipeline infrastructures. However, the method does have its shortcomings. For example, as insertion resistance increases over long spans, the length and complexity of pipes is limited. Furthermore, it is also necessary to consider the reduction in supply capacity of a pipe renovated by this method as a result of the annular gap between the existing pipe and the internal pipe.

Pipe Bursting Method

The method, as the name implies, is executed by expansion and cracking of the existing pipe by insertion of a hydraulic expander inside it, accompanied by insertion of a moulded polyethylene pipe into the space thus formed. Benefits of this method are the simplicity of use and the ability to install pipes with an equivalent or larger diameter than the existing pipe. However, disadvantages are the potential damage to other infrastructures in urban environments, and the difficulty in disposing of residual pipe fragments.

Polyethylene Thin Wall Lining (PETWL)

A folded polyethylene liner is inserted into the existing pipe and pressure applied to produce a "close fit" liner, which is subsequently held in place by the water pressure within the pipeline.

All three of the above methods are disadvantaged by their inability to deal with multiple bends in a pipeline and, more importantly, the fact that lateral connection pipes to customers' premises have to be disconnected and then reinstated after execution of the renovation process.

A need therefore exists for a renovation method which has the capability to accommodate long pipe spans (up to 200 meters) and pipe bends, and which obviates the necessity for reinstatement of lateral connection pipes.

SUMMARY OF THE INVENTION

The invention provides a method for the renovation of existing drinking water pipelines by means of the application of a liquid, two-part coating composition to the internal surface of the pipeline so as to form, at high cure rate, a monolithic flexible lining with high strength and ductility.

Preferably, the method is carried out by spraying the coating composition onto the internal surface of the pipeline from an apparatus which is moved through the pipeline so that the method of the invention obviates any need for disconnection and subsequent reinstatement of lateral connection pipes.

According to the invention, there is provided a method of forming a coating on the internal surface of a drinking water pipeline, the method comprising the steps of:

a) providing a liquid, two-part coating system
b) mixing together the first part and the second part to form a mixture, and
c) applying the mixture as a coating to said surface so as to form, at high cure rate, a monolithic lining which exhibits high strength and flexibility.

Preferably the two parts of the system are applied through heated airless spray equipment. Such equipment may, for example, include a centrifugal spinning head or a self-mixing spray gun assembly.

In a first group of embodiments, the first part of the two-part coating system comprises an aliphatic polyisocyanate compound and the second part comprises one or more aromatic polyamines blended with one or more polyhydric alcohol compounds.

In a second group of embodiments, the first part again comprises one or more aliphatic polyisocyanates, but no polyhydric alcohols are used and instead, appropriate coating properties are achieved by selection of the polyisocyanate component used and by close control of the proportion of the components used. Thus, in some embodiments of the second group, the polyisocyanate comprises a prepolymer derived from HDI, for example, from the uretdione of HDI or from the biuret of HDI or from the isocyanate trimer of HDI. The aliphatic isocyanate, in this second group of embodiments, preferably has an isocyanate content of 5 to 15% by weight.

BRIEF DESCRIPTION OF THE DRAWINGS

FIG. 1 is a table showing the composition of a number of coating systems prepared from binary and ternary mixtures comprising an aromatic polyamine (ETHACURE 100), selected oligomeric polyamines and a secondary aliphatic polyamine (AMINE SDA 172), cured with DESMODUR N3400 at an isocyanate index of 1.0.

FIG. 2 is a table showing the physical properties of the coating systems detailed in Table 1.

FIG. 3 is a table showing the results of a series of screening tests carried out on the coating systems detailed in Table 1 in order to assess their likely suitability for contact with drinking water.

FIG. 4 is a table that details the composition of a number of coating systems prepared from binary mixtures comprising an aromatic polyamine (ETHACURE e 100) and selected branched polyether-ester polyols cured with DESMODUR N3400 at an isocyanate index of 1.0, and catalysed with FOMREZ UL-28 (0.5 pbw per 100 of polyol).

FIG. 5 is a table showing the physical properties of the coating systems detailed in Table 4.

FIG. 6 is a table showing the results of a series of screening tests undertaken on the coating systems detailed in Table 4, in order to assess their likely suitability for contact with drinking water.

FIG. 7 is a table showing the composition of a number of coating systems (identified by letters S, T, V & W) prepared from a prepolymer derived from the isocyanurate trimer of HDI (DESMODUR N3800), blended with the uretdione of HDI (DESMODUR N3400) and cured with an aromatic polyamine (ETHACURE 100) at an isocyanate index of 1.0.

FIG. 8 is a table showing the physical properties of the coating systems detailed in Table 7.

FIG. 9 is a table showing the results of a series of screening tests undertaken on the coating systems detailed in Table 7 in order to assess their likely suitability for contact with drinking water.

DETAILED DESCRIPTION OF THE PREFERRED EMBODIMENTS

The preferred embodiments of the present invention provide a two-part coating system that can be applied to the internal surfaces of existing pipeline infrastructures so as to form, at a high cure rate, a monolithic flexible lining, which exhibits high strength. By virtue of its strength, flexibility and non-tainting characteristics, the system of the present invention is particularly useful for the renovation of existing drinking water pipelines.

The first part of a two-part coating system, according to both the first and the second group of embodiments, of the present invention, comprises one or more aliphatic polyisocyanates. The first liquid part may, for example, comprise an aliphatic isocyanate derived from hexamethylene di-isocyanate (HDI). Suitable polyisocyanates include derivatives of hexamethylene-1,6-diisocyanate; 2,2,4-trimethylhexamethylene diisocyanate; isophorone diisocyanate; and 4,4'dicyclohexylmethane diisocyanate. For the purposes of the first group of embodiments of the present invention the preferred polyisocyanates are the uretdione, biuret and isocyanurate trimer of hexamethylene-1,6-diisocyanate, with the uretdione being particularly preferred.

In the first group of embodiments of the invention, the preferred polyisocyanates have an isocyanate content of 15–30%, with an isocyanate content of 20–25% being particularly preferred.

The second part of a two-part coating system, in this first group of embodiments of the present invention, comprises one or more aromatic polyamines blended with one or more polyhydric alcohol compounds. The polyhydric alcohol compound may be a branched polyether-ester polyol, for example having a hydroxyl content of 2–10%.

Suitable aromatic polyamines include diethyl toluenediamine; dimethylthio toluenediamine; 4,4'-methylenebis (2-isopropyl-6-methylaniline); and 4,4'-methylenebis (3-chloro-2,6-diethylaniline). For the purposes of the present invention, diethyl toluenediamine is particularly preferred.

The polyhydric alcohol compounds can be polyester or polyether polyols containing at least two hydroxyl groups per molecule. For the purposes of the present invention, branched polyether-esters are particularly preferred. The preferred polyols have a hydroxyl content of 2–10%, with a hydroxyl content of 4–8% being particularly preferred.

In order to accelerate the reaction between the polyol and the polyisocyanate, the second part of the coating system may optionally contain a suitable catalyst. A number of organo-metallic compounds may be used, however for the purposes of the present invention, tin compounds are preferred, with dibutyltin dilaurate and dimethyltin carboxcylates being particularly preferred.

As noted, the first part of a two-part coating system, in the second group of embodiments of the present invention, again comprises one or more aliphatic polyisocyanates. Again, the first liquid part may, for example, comprise an aliphatic isocyanate derived from hexamethylene di-isocyanate (HDI). Suitable polyisocyanates again include derivatives of hexamethylene-1,6-diisocyanate; 2,2,4-trimethylehexamethylene diisocyanate; isophorone diisocyanate; and 4,4' dicyclohexylmethane diisocyanate. For the purposes of the second group of embodiments of the present invention, the preferred polyisocyanates are prepolymers derived from hexamethylene-1,6-diisocyanate (HDI) or prepolymers derived from the dimeric or trimeric forms of HDI. Thus, the polyisocyanate may comprise a prepolymer derived from the uretdione or the biuret of HDI, or from the isocyanurate trimer of HDI. Where such a prepolymer is used, the prepolymer may be blended with the uretdione of HDI, or with the biuret of HDI, or with the isocyanurate trimer of HDI, in any combination. The preferred polyisocyanates have an isocyanate content of 5–15%, with an isocyanate content of 8–12% being particularly preferred.

The second part of the two-part coating system, according to the second group of embodiments of the invention again comprises one or more aromatic polyamines, but in this case without polyhydric alcohols. Suitable aromatic polyamines again include diethyl toluendiamine; dimethylthio toluendiamine; 4,4'-methylenebis (2-isoproppyl-6-methylaniline); 4,4'-methylenebis (2,6-diisopropylaniline); 4,4'-methylenebis (2-ethyl-6-methylaniline); and 4,4' methylenebis (3-chloro-2,6-diethylaniline). For the purposes of the present invention, diethyl toluenediamine is particularly preferred.

A number of two-part systems embodying the invention are described below, by way of non-limiting example with reference to Tables 1 to 9 which form the accompanying drawings, and in which:

Table 1 identifies various two part systems in accordance with a first group of embodiments of the invention, Tables 2 and 3 set out properties of the respective systems, Table 4 sets out further two-part systems, of which at least those indicated at L to R are in accordance with the first aspect of the invention, Tables 5 and 6 set out properties of the respective systems of Table 4, Tables 7 and 8 identify various two-part systems in accordance with a second group of embodiments of the invention, and Table 9 sets out properties of the systems of Tables 7 and 8.

In carrying out the method of the invention, the first and second parts of the system are fed independently, e.g. by flexible pipelines, to a spraying apparatus, known per se, capable of being propelled through an existing pipeline to be renovated. The apparatus preferably heats the two parts of the system prior to application to the pipeline interior and mixes the two parts immediately before applying the mixture to the interior surface of the pipeline. The mixture of the two parts cures on the interior surface of the pipeline to form a flexible impervious coating.

In view of the confined spaces within the pipeline and the resultant lack of suitable outlet for vapour, both the first part and the second part of the system, in each case, are free of any volatile solvent. That is to say, solidification of the system applied to the pipeline interior is in no way a result of drying or evaporation of solvent from either part of the system.

EXAMPLES

Referring firstly to Tables 1 to 6, in each of the examples illustrated therein, the first part of the system comprises an isocyanate, for example DESMODUR N3400, as indicated by the following brief notes referring to the Tables, whilst the second part of the system comprises a blend of the components indicated in the first three columns to the left of each table. In each of Tables 1 and 4, the column at the extreme right indicates the amount of the isocyanate first part used. The quantities indicated in Tables 1 and 4 are parts by weight.

Table 1 shows the composition of a number of coating systems prepared from binary and ternary mixtures comprising an aromatic polyamine (ETHACURE 100), selected oligomeric polyamines and a secondary aliphatic polyamine (AMINE SDA 172), cured with DESMODUR N3400 at an isocyanate index of 1.0.

Table 2 shows the physical properties of the coating systems detailed in Table 1. It can be seen from the tensile and flexural properties of these systems that they possess the combination of strength and ductility that could render them useful as rapid setting pipeline renovation materials.

Table 3 shows the results of a series of screening tests carried out on the coating systems detailed in Table 1 in order to assess their likely suitability for contact with drinking water. It can be seen from these results that whilst all the systems satisfy the Flavour & Odour element of the BS6920 Suitability for Contact with Potable Water test, the T.O.C (total organic carbon) figures suggest that the materials would be unlikely to gain the necessary regulatory approvals for use in contact with public water supplies.

Table 4 details the composition of a number of coating systems prepared from binary mixtures comprising an aromatic polyamine (ETHACURE 100) and selected branched polyether-ester polyols cured with DESMODUR N3400 at an isocyanate index of 1.0, and catalysed with FOMREZ UL-28 (0.5 pbw per 100 of polyol).

Table 5 shows the physical properties of the coating systems detailed in Table 4. Again it can be seen from the tensile/flexural properties of these systems that they could potentially be useful as rapid setting pipeline renovation materials.

Table 6 shows the results of a series of screening tests undertaken on the coating systems detailed in Table 4, in order to assess their likely suitability for contact with drinking water. A number of the systems satisfy the requirements of the Flavour & Odour element of BS6920, and, furthermore, afford T.O.C figures such that they would be likely to gain the required regulatory approvals for use in contact with public water supplies.

Referring now to Tables 7 to 9, in Table 7, further examples are illustrated, in each of which the first part of the system again comprises an isocyanate (DESMODUR N3400 and/or DESMODUR N3800), whilst the second part of the system comprises an aromatic polyamine (diethyl toluenediamine) in these examples, (ETHACURE 100).

EXAMPLES

FIG. 1 is a table showing the composition of a number of coating systems prepared from binary and ternary mixtures comprising an aromatic polyamine (ETHACURE 100), selected oligomeric polyamines and a secondary aliphatic polyamine (AMINE SDA 172), cured with DESMODUR N3400 at an isocyanate index of 1.0.

FIG. 2 is a table showing the physical properties of the coating systems detailed in Table 1. It can be seen from the tensile and flexural properties of these systems that they possess the combination of strength and ductility that could render them useful as rapid setting pipeline renovation materials.

FIG. 3 is a table showing the results of a series of screening tests carried out on the coating systems detailed in Table 1 in order to assess their likely suitability for contact with drinking water. It can be seen from these results that whilst all the systems satisfy the Flavour & Odour element of the BS6920 Suitability for Contact with Potable Water test, the T.O.C (total organic carbon) figures suggest that the materials would be unlikely to gain the necessary regulatory approvals for use in contact with public water supplies.

FIG. 4 is a table that details the composition of a number of coating systems prepared from binary mixtures comprising an aromatic polyamine (ETHACURE 100) and selected branched polyether-ester polyols cured with DESMODUR N3400 at an isocyanate index of 1.0, and catalysed with FOMREZ UL-28 (0.5 pbw per 100 of polyol).

FIG. 5 is a table showing the physical properties of the coating systems detailed in Table 4. Again it can be seen from the tensile/flexural properties of these systems that they could potentially be useful as rapid setting pipeline renovation materials.

FIG. 6 is a table showing the results of a series of screening tests undertaken on the coating systems detailed in Table 4, in order to assess their likely suitability for contact with drinking water. A number of the systems (identified by the letters L, M, N and P) satisfy the requirements of the Flavour & Odour element of BS6920, and, furthermore, afford T.O.C figures such that they could be considered candidates for use in contact with public water supplies. However, a series of screening tests on selected coating systems (system L, M, N & P) detailed in Table 4, in order to further assess their likely suitability for contact with public water supplies, showed that whilst all of these systems appeared promising in terms of BS6920 and T.O.C test results, leachate samples produced from all these compositions exhibited the presence of a number of unknown/unidentifiable compounds when examined by GCMS techniques, such that these compositions (L, M, N & P), could be considered unlikely to gain the regulatory approvals for contact with public drinking water supplies.

FIG. 7 is a table showing the composition of a number of coating systems (identified by letters S, T, V & W) prepared from a prepolymer derived from the isocyanurate trimer of HDI (DESMODUR N3800), blended with the uretdione of HDI (DESMODUR N3400) and cured with an aromatic polyamine (ETHACURE 100) at an isocyanate index of 1.0.

FIG. 8 is a table showing the physical properties of the coating systems detailed in Table 7. It can be seen from the tensile and flexural properties of these systems that they possess a combination of strength and ductility which could render them useful as rapid setting pipeline renovation materials.

FIG. 9 is a table showing the results of a series of screening tests undertaken on the coating systems detailed in Table 7 in order to assess their likely suitability for contact with drinking water. From the results, it can be concluded that these systems would be likely to gain the required regulatory approvals for use in contact with public water supplies.

The chemical identities of the various materials referred to herein by trade names and Registered Trade Marks, as well as sources for these materials, can be ascertained by reference to the following "Glossary of Materials and Test Procedures".

| GLOSSARY OF MATERIALS AND TEST PROCEDURES | |
|---|---|
| ETHACURE 100 | Diethyl toluenediamine: Albermarle Corporation |
| JEFFAMINE D2000 | Poly (oxypropylene) diamine, approx. 2000 molecular weight: Huntsman |
| VERSALINK P-650 | Poly (oxytetramethylene)-di-p-aminobenzoate, approx. 800 molecular weight: Air Products and Chemicals Inc. |
| AMINE SDA 172 | N,N'-di-tert-butylethylenediamine Nitroil GmbH |
| DESMOPHEN 1145 | Branched polyether-ester polyol, hydroxyl content approx. 7.2%: Bayer |
| DESMOPHEN 1150 | Branched polyether-ester polyol, hydroxyl content approx. 5.4%: Bayer |
| SOVERMOL 805 | Branched polyether-ester polyol, hydroxyl content approx. 5.4%: Cognis GmbH |
| SOVERMOL 815 | Branched polyether-ester polyol, hydroxyl content approx. 6.0%: Cognis GmbH |
| FOMREZ UL-28 | Dimethyltin carboxylate: Witco GmbH |
| DESMODUR N3400 | Uretdione of hexamethylene-1,6-diisocyanate, isocyanate content approx. 22%: Bayer |
| DESMODUR N3800 | Flexibilising trimer of hexamethylene-1,6-diisocyanate, isocyanate content approx. 11%: Bayer |
| Tensile Properties | BS EN ISO 527:1996 |
| Flexural Properties | BS EN ISO 178:1997 |
| Flavour & Odour | BS 6920, 2.2.3:2000 |
| T.O.C | 24 hour stagnation, 1 ml water/cm$^2$ |
| GCMS General Survey | 24 hour stagnation, 1 ml water/cm$^2$ |

What is claimed is:

1. A method of forming a coating on the internal surface of a pipeline, the method comprising the steps of:
   a) providing a liquid, two-part coating system;
   b) mixing together the first part and the second part to form a mixture; and
   c) applying the mixture as a coating to said surface so as to form, at high cure rate, a monolithic lining which exhibits high strength and flexibility;

wherein the first liquid part comprises a polyisocyanate prepolymer derived from an uretdione, a biuret or an isocyanurate of hexamethylene di-isocyanate (HDI) blended with a member of the group consisting of the uretdione of HDI, the biuret of HDI and the isocyanurate of HDI; and wherein the second part of the liquid coating system comprises one or more aromatic polyamines.

2. The method according to claim 1 wherein the polyisocyanate prepolymer has an isocyanate content of 5–15% by weight.

3. The method according to claim 1 wherein the aromatic polyamine is selected from the group consisting of diethyl toluenediamine; dimethylthio toluenediamine; 4,4'-methylenebis (2-isopropyl-6-methylaniline); 4,4'-methylenebis (2,6-diisopropylaniline); 4,4'-methylenebis (2-ethyl-6-methylaniline); and 4,4'-methylenebis (3-chloro-2,6-diethylaniline).

4. The method according to claim 1 wherein the mixture is applied through heated airless spray equipment.

5. The method according to claim 4 wherein said spray equipment includes a centrifugal spinning head or self-mixing spray gun assembly.

6. The method according to claim 1, wherein the first part of the liquid coating system comprises a prepolymer derived from the isocyanurate trimer of HDI, blended with the uretdione of HDI.

7. The method of claim 6, wherein the aromatic polyamine is diethyl toluenediamine.

8. The method of claim 1, wherein the pipeline is a drinking water pipeline.

9. The method of claim 1, wherein the pipeline is an existing pipeline infrastructure.

* * * * *